(12) United States Patent
Vogel et al.

(10) Patent No.: US 7,992,533 B2
(45) Date of Patent: Aug. 9, 2011

(54) SHAFT WITH FUNCTIONAL BODIES SUCH AS CAMSHAFTS FOR INTERNAL COMBUSTION ENGINES, METHOD OF PRODUCING THEM AND ENGINES EQUIPPED THEREWITH

(75) Inventors: Manfred Vogel, Kappelrodeck (DE); Matthias Derse, Elzach (DE); Matthias Bechtold, Haslach-Bollenbach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 784 days.

(21) Appl. No.: 12/026,548

(22) Filed: Feb. 5, 2008

(65) Prior Publication Data

US 2008/0173128 A1 Jul. 24, 2008

Related U.S. Application Data

(63) Continuation of application No. PCT/DE2006/001378, filed on Aug. 7, 2006.

(30) Foreign Application Priority Data

Aug. 5, 2005 (DE) .......................... 10 2005 036 995

(51) Int. Cl.
*F01L 1/04* (2006.01)
(52) U.S. Cl. ................. 123/90.6; 123/90.16; 123/90.44; 29/888.1; 384/548
(58) Field of Classification Search ............... 123/90.6, 123/90.16, 90.44; 29/888.1; 384/548, 554
See application file for complete search history.

(56) References Cited

U.S. PATENT DOCUMENTS

| | | | | |
|---|---|---|---|---|
| 4,841,627 A | * | 6/1989 | Arnold et al. | 29/720 |
| 4,993,282 A | * | 2/1991 | Swars | 74/567 |
| 5,218,883 A | | 6/1993 | Swars | |
| 6,286,196 B1 | | 9/2001 | Vogel | |
| 6,804,884 B1 | | 10/2004 | Vogel | |
| 2004/0134063 A1 | | 7/2004 | Vogel | |

FOREIGN PATENT DOCUMENTS

| | | | |
|---|---|---|---|
| DE | 4336809 A1 | * | 5/1995 |
| DE | 198 31 333 A1 | | 1/2000 |
| DE | 199 38 791 A1 | | 3/2001 |
| DE | 101 01 539 A1 | | 8/2002 |
| DE | 10 2004 009 074 B3 | | 7/2005 |
| EP | 0 866 216 A1 | | 9/1998 |
| WO | WO 02/16741 A1 | | 2/2002 |
| WO | WO 03/008842 A1 | | 1/2003 |

OTHER PUBLICATIONS

International Search Report dated May 15, 2007 (Six (6) pages).

* cited by examiner

*Primary Examiner* — Ching Chang
(74) *Attorney, Agent, or Firm* — Crowell & Moring LLP

(57) ABSTRACT

A shaft comprising functional elements, such as an assembled camshaft for an internal combustion engine, a method for producing such shafts, and internal combustion engines equipped with such shafts. The functional elements each have a bore and are produced separately from the shaft main body, and the bore is subsequently press fit onto the shaft body to attach the functional element in an axially and rotationally fixed manner. The shaft is also provided with at least one roller bearing that includes at least one undivided roller bearing element which is mounted on the shaft body between two functional elements, for example, by press fitting.

30 Claims, 1 Drawing Sheet

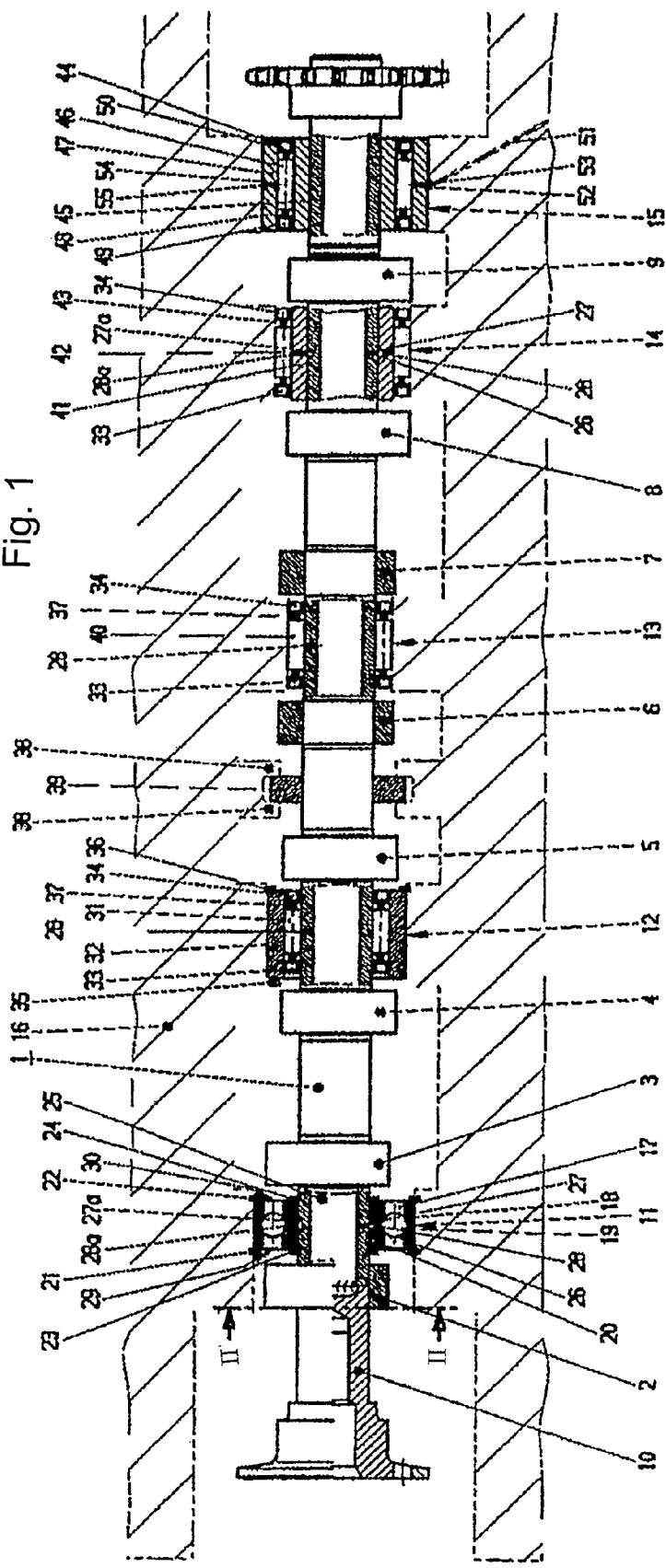
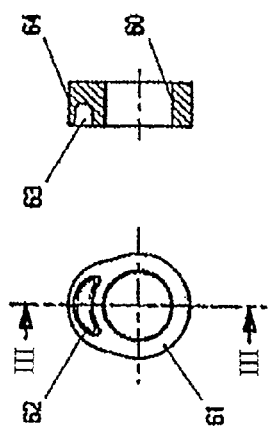

SHAFT WITH FUNCTIONAL BODIES SUCH AS CAMSHAFTS FOR INTERNAL COMBUSTION ENGINES, METHOD OF PRODUCING THEM AND ENGINES EQUIPPED THEREWITH

CROSS REFERENCE TO RELATED APPLICATIONS

This application is a continuation of international application no. PCT/DE2006/001378, filed Aug. 7, 2006 designating the United States of America and published in German on Feb. 15, 2007 as WO 2007/016913, the entire disclosure of which is incorporated herein by reference. Priority is claimed based on Federal Republic of Germany patent application no. DE 10 2005 036 995.2, filed Aug. 5, 2005.

BACKGROUND OF THE INVENTION

The present invention relates to shafts having at least one functional body, manufactured separately from the shaft and then fastened on the shaft, such as assembled camshafts, which are mountable inside an internal combustion engine, as well as methods for producing such shafts and internal combustion engines equipped therewith.

Assembled camshafts, as well as methods for their production, in which separately produced cams are fixed on a shaft, are known, for example, from U.S. Pat. No. 6,286,196 (=DE 198 31 333), U.S. Pat. No. 6,804,884 (=DE 199 38 791) and US patent publication no. 2004/0134063 (=DE 101 01 539).

Assembled camshafts of this type provide an array of advantages in comparison to typical, forged camshafts. Thus, for example, cost reductions are achieved by producing the cams individually and then fastening the cams on the shaft, in particular because costly and complex forging tools and production processes are avoided, and because different materials, which are each optimal for the part in which they are used, may be used for the shafts and the cams. Further advantages, such as weight and cost reduction, also result if hollow shafts are used. Moreover, the principle of assembled camshafts allows significantly broader and more cost-effective flexibility in producing alterations, adaptations, and variants. In addition, the complex tempering of the entire shaft may be dispensed with.

The mounting of camshafts, whether with solid cams molded on in one piece, or separately formed cams assembled to a shaft, has been performed up to this point either via friction bearings or using split roller bearings, because closed, i.e., unitary bearings for use between two neighboring cams, could not be pushed axially over the cams because the cams have a larger diameter than the bearing journals. Therefore, it was not possible for the above-mentioned reasons to use camshafts as pre-assembled units and to exploit the mounting possibilities associated therewith, nor to fully exploit the advantages of roller bearings, such as lower power losses.

Additional types of assembled shafts for internal combustion engines to which the present invention also relates include, for example, balancer shafts and the like. The above-mentioned disadvantages also exist for such assembled shafts. Thus, up to this point, the bearings for such shafts in the corresponding housing sections of the internal combustion engine have been constructed as slide bearings or split roller bearings, at least to the extent that the bearings are envisioned for use between two balancing weights.

SUMMARY OF THE INVENTION

Accordingly, it is an object of the present invention to remedy the disadvantages of prior camshafts and also of other shafts, particularly those in which the shaft body extends through attached functional bodies and the diameter of the functional bodies is greater than that of the bearing journals.

Another object of the invention is to improve, simplify and reduce the cost of assembling engines.

It is also an object of the invention to reduce the power loss in internal combustion engines and thus save fuel.

An additional object of the invention is to improve the manufacturing precision of functional bodies produced separately from shafts and subsequently pressed axially thereon having a shape deviating from a circular shape, in particular of their functional faces, i.e., the faces which act on the valve tappets in cams.

These and other objects are achieved in accordance with the present invention by providing a shaft and/or an internal combustion engine equipped with such a shaft in that, for the mounting of the shaft, which at least one functional body is pressed onto axially and fastened rotationally fixed, i.e., through which the shaft extends—such as a so-called "assembled camshaft"—at least one of the journals is constructed as a roller bearing, at least one undivided element of a roller bearing, which is thus closed per se, being provided on the shaft, and the shaft and the at least one element of a roller bearing thus together constituting a pre-assembled module. As used herein the term "undivided" is used to designate a unitary member having an unbroken circumference so that it can only be disposed around a shaft by extending the shaft axially through an aperture or bore therein, as opposed to a split bearing which can be opened at the split for placement around a shaft.

A complete undivided roller bearing may be affixed to the shaft, i.e., a roller bearing comprising inner and outer rings and roller bodies provided between them.

A second embodiment of a roller bearing may be constructed in such a way that a roller bearing is formed in which the roller bearing elements, namely roller bodies having undivided cage and undivided outer rings, are mounted on the shaft, and the roller bodies roll directly on the shaft, i.e., a bearing without an inner ring.

A third embodiment of a bearing may be constructed in such a way that only the roller bodies held together via an undivided cage, e.g., needles, are mounted on the shaft, and the roller bodies thus roll directly on the shaft on one side and directly on rolling areas formed in the cylinder head on the other side.

A fourth embodiment of a roller bearing may be constructed in such a way that an inner bearing ring including the roller bodies held together via an undivided cage is mounted on the shaft.

In embodiments in which at least one race for the roller bodies is provided directly on the shaft, i.e., in the second and third embodiments described above, it may be advantageous if the shaft comprises a material which has the quality of bearing rings. The journal may also be tempered and ground or precision turned.

If a bearing having an inner ring is used, i.e., a complete bearing having inner and outer rings and roller bodies or a bearing solely comprising an inner ring and roller bodies, it may be advantageous if—in addition to the functional bodies such as cams—the inner ring is also press fit on the shaft in a rotationally fixed manner.

Through the present invention, it is possible to exploit the advantages of roller bearings, e.g., in the mounting of camshafts, in particular even with camshafts in which the radial cam extension extends beyond the radius of the bearing seat on the shaft.

It is especially advantageous if the camshaft is hollow, so that lubricant oil may be supplied through the hollow shaft to a hole which advantageously leads from the interior of the shaft to the journal. If a roller bearing having an inner ring is used, it is advantageous if either an annular groove is provided in the internal area of the inner ring or if such a groove is introduced in the area of the bearing seat, in which the hole extending through the shaft noted above opens. A hole, which opens on one side into the groove and on the other side into the circular path of the roller bodies, is preferably introduced in the inner ring of the bearing itself.

If a roller bearing without an inner ring and having undivided outer ring and roller bodies held together via an undivided cage is used, the aforementioned radial hole, which opens into the circular path in the area of the roller bodies, advantageously may be formed in the shaft. The lubricant may be supplied in the same way in a bearing without inner and outer rings, i.e., a bearing comprising only having roller bodies held together via an undivided cage.

If the camshaft according to the present invention is used, for example, in a cylinder head in which oil is supplied in a conventional way through holes provided in the cylinder head, i.e., if a roller bearing having outer ring is used, it may be advantageous if an annular groove is provided in the external contour of the outer ring and/or in the contour of the cylinder head enclosing the bearing, and the outer ring has a hole leading at least approximately radially from the groove outward to the circular path of the roller bodies.

To limit the circulating oil flow, it may be advantageous to construct at least a partial area of the annular groove and/or the hole as a throttle.

However, a seal—also in one piece—may also be provided on at least one side of the roller bearing, but advantageously on both sides of the rollers, because then if the seals are appropriately constructed as gap seals, the seals may produce a throttling effect.

To axially guide the camshaft in the cylinder head or engine block, it may be advantageous if an axial and radial bearing is used which has an outer ring that can be fixed in a recess of the cylinder head or engine block.

The shaft may also be fixed axially via a form fit using a radial contour originating from the shaft cooperating with a counter contour on the cylinder head or engine block. The radial contour originating from the shaft may be formed on the shaft, but the contour may also be formed by a disk which is pressed on axially or the like, or by at least one snap ring.

However, the present invention also extends to a balancer shaft for an internal combustion engine, which balancer shaft is produced as an assembled component comprising a shaft main body and separately manufactured balancing weights which are axially pushed or pressed onto the shaft body to affix them to the shaft in an axially and rotationally fixed manner. The balancing weights may advantageously be attached to the shaft body in accordance with any of the methods disclosed in U.S. Pat. No. 6,286,196 or U.S. Pat. No. 6,804,884 or US patent publication no. 2004/0134063, which are incorporated herein by reference in their entireties, whereby the mounting of the balancing elements in the described manner can be achieved via at least one one-piece element of a roller bearing. The present invention further relates to internal combustion engines equipped with such shafts.

However, the present invention is not restricted to camshafts or balancer shafts, but also relates to other shafts which extend through a functional body which is pushed and/or pressed onto the shaft.

A further concept of the present invention relates to the production of so-called assembled shafts having non-round or eccentric functional bodies, i.e., camshafts, for example, in which cams are attached by being axially pressed onto a shaft main body. It has been found that in camshafts of this type in which the cams are first ground to their desired contour and are subsequently pressed onto the shaft body, the external shape of the cams deviates from the desired contour in such a way that the engine controller is adversely influenced. Not only is the cylindrical attachment area deformed, but there are also deformations in the elevated or lobed area of the cam. Accordingly, the present further concept of the invention is based on the object of avoiding deformations of this type and in particular providing camshafts in which the external contour of the functional bodies, i.e., the cams, for example, also corresponds to the intended contour in the installed state. This is achieved in that during the machining of the external contour, the cam is chucked via its internal bore using a clamping element, e.g., a hydraulic or mechanical mandrel, so that the cam is expanded in a manner corresponding to the expansion which results after the assembly of the cam on the camshaft. The external contour may thus be produced exactly according to the target contour.

Another concept of the present invention relates to the design of functional bodies, such as cams for an assembled camshaft in particular. This part of the present invention is based on the object of saving material, reducing the cost of camshafts, and reducing the imbalance in camshafts. This is achieved according to the present invention in that a groove which at least partially penetrates in the axial direction of the cam is introduced in the cam in the area of the cam lobe. This groove may extend continuously through the cam in the axial direction, or it optionally may extend only partially through the cam. The groove—viewed in the direction toward the front side of the cam—may be crescent-shaped and only be introduced from one side, or also from both sides. The groove may also be a continuous, at least approximately circular recess. In this way a significant part of the costly material which is otherwise used in solid cams may be saved.

BRIEF DESCRIPTION OF THE DRAWINGS

The invention will be described in further detail hereinafter with reference to illustrative preferred embodiments shown in the accompanying drawing figures, in which:

FIG. 1 is a side elevation view of a camshaft mounted in a cylinder head of an internal combustion engine;

FIG. 2 is sectional view taken along line II-II of FIG. 1 showing the cam, and

FIG. 3 is as sectional view taken along line III-III of FIG. 2.

DETAILED DESCRIPTION OF PREFERRED EMBODIMENTS

The joined or assembled camshaft 1 shown in FIG. 1 comprises cams 2 through 9, which are fixed on the shaft main body 10 both in the axial direction and also in the forming direction by being axially pressed on. Roller bearing embodiments 11-15, which are constructed differently in the illustrated working embodiment, are also pushed on axially and provided between two respectively adjacent cams.

A complete ball bearing 17, comprising an outer ring 18, roller bearings 19 and an inner ring 20, is used to form the illustrated bearing 11.

The axial fixation of the camshaft 1 is achieved here by four snap rings 21-24. However, the inner ring may be fastened axially and rotationally fixed like the cams on the camshaft main body 10 to secure the bearing axially on the shaft main body and thus also the camshaft in the cylinder head. The components may, for example, be fixed to the shaft by a fastening process as described in U.S. Pat. No. 6,286,196 (=DE 198 31 333) in which a hollow shaft is extended through bores in the components until the components are positioned in specified locations on the shaft, and a pressure fluid is then introduced into the hollow interior of the shaft to expand the shaft and produce a press fit between the components and the expanded shaft. Advantageously, a plurality of support matrices may be positioned against intervening sections of the hollow shaft between the components in order to brace the intervening sections of the hollow shaft against expansion by the pressure fluid. Alternatively, the components may be fixed to the shaft by a fastening process as described in U.S. Pat. No. 6,804,884 (=DE 199 38 791) in which a part with an inner bore is pushed onto the shaft into a predetermined position with frictional contact to produce a press fit connection. Advantageously, the part with the bore may be provided with a substantially wedge-shaped lubricant groove on the front face of the part surrounding the bore from which lubricant is drawn into the bore as the part is pushed onto the shaft to reduce the friction between the part and the shaft. After the part has reached the desired position, the lubricant may be treated, e.g. by heating, to eliminate its friction reducing function and provide a secure friction fit. In yet another alternative, the gears may be fixed to the shaft by a process as described in US 2004/0134063 (=DE 101 01 539) in which the shaft is stretched to reduce its diameter, after which a part having a bore with a diameter between the unstretched diameter and the stretched diameter of the shaft is moved to the desired position on the shaft and then the stretching force is released so that the shaft can expand again to produce a secure friction fit with the bore of the part. The entire disclosure of each of these documents is hereby incorporated herein by reference.

At the journal 11, the bearing may be lubricated especially advantageously via the cavity 25 in the main body 10, in that, as shown below the centerline, a hole 26 is provided in the shaft main body 10, which opens into an annular cavity 27 provided in the inner ring 10, from which a radial hole 28 in turn originates, which ends in the race of the balls 19. In the exemplary embodiment illustrated above the centerline, the lubricant supply opening in the shaft main body 10 is identified by 26a, which opens into the annular cavity 27a in the shaft main body 10. A hole 28 leads to the race of the balls 19 in the area of this cavity 27a. To limit the lubricant volume passing through the bearing, the hole 28, the annular cavity 27, and the hole 28 may be configured as a throttle, but seal elements 29, 30 which act as a gap seal may also be provided.

If the bearing journals are constructed as shown, for example, by the journal 12, the pre-assembled camshaft, which is provided with undivided elements of a roller bearing, contains both roller bodies 31 which are held together by a cage 37, also undivided, and also the outer ring 32. A hole 28 may again penetrate the shaft main body 10 for lubrication. Seals 34, 35 may be constructed as gap seals to throttle the lubricant oil flow. The outer ring 32 is held fast in the housing by an annular shoulder 35 and a snap ring 36. The camshaft is secured in relation to the housing by two annular shoulders 38 attached in the housing and a shoulder or an annular disc 39, which is also fastened to the shaft main body 10 by being axially pressed on.

In a journal embodiment 13 in a camshaft produced as a pre-assembled unit, only the elements of a roller bearing held together by a one-piece cage 37, namely the roller bodies 40, are pre-mounted. The bearing also may be lubricated through a hole 28, and the oil flow may be throttled by corresponding gap seals 33, 34 in the journal 13 in the same way as on the journal 11.

In a journal embodiment 14, the pre-assembled unit specifically contains a camshaft and at least undivided elements of a roller bearing, the undivided inner ring 41 pushed or pressed onto the bearing seat and the rollers 42, which are held together by an undivided cage 43. Seals 33, 34 may again be provided laterally of the rollers 42. As in the journal 11, a hole 26 may be provided in the main body 10 for supplying lubricant, together with an annular cavity 27 in the inner ring and a hole 28 in the outer ring. The annular cavity may also be introduced into the shaft main body, however, in the form of the annular chamber 27a, from which the hole 28a opens into the race.

To form bearings corresponding to the journal identified by reference numeral 15, the camshaft again contains complete roller bearings in the form of the needle bearing 44 having an inner ring 45 pushed or pressed on the shaft body, an outer ring 46, rollers 47, cage 48, and seals 49, 50, which are constructed as a throttle. In this embodiment—and also in the journal 11—, the outer ring 46 may be axially fixed by a press fit, and a bearing having axial guiding may be used as the bearing.

The lubricating oil is supplied in a typical manner here via an oil supply hole 51 provided in the cylinder head to an annular cavity 52 introduced around the outer bearing ring 45, to a radial hole 53 in the outer ring. The hole 51 may also lead to an annular cavity 54 provided in the external bearing 46 and from there through a hole 55 to the race of the roller bodies 47.

In one embodiment of the journals corresponding to 12 or 13, a race for the roller bodies is provided directly on the shaft main body. In such an embodiment, it may be advantageous if the material of the shaft main body has the quality of bearing ring material. The journals of the shafts according to 12, 13 may also be hardened, ground, or precision turned, however. In the embodiments according to the journals identified by reference numerals 12 and 13, the journals for the outer races are machined with corresponding quality.

As already noted, the present invention is not restricted to camshafts, but rather also relates to other shafts, such as balancer shafts in particular, i.e., those shafts in which functional elements extend beyond the shaft diameter and the shaft extends continuously on both sides of the functional elements up to its journals and whose functional bodies are attached in a radially and rotationally fixed manner, in particular by being axially pressed on, for example, as described in the patent documents cited above, which have been incorporated herein by reference.

FIG. 2 shows the cam 3 in a view corresponding to line II-II of FIG. 1 and FIG. 3 shows a section along line III-III of FIG. 2.

The cam 3 has a hole 60 and a partially cylindrical region 61, which transitions into an elevated region or lobe 62. A groove 63 is introduced into the elevated cam region 62 to save material and weight. The groove 63 may also be constructed as continuous in the axial direction.

Cams of this type are manufactured at their final dimensions by appropriate metal working, namely by forging, optionally sandblasting, turning of the hole 60, hard turning of the hole to the assembly dimensions, grinding of the outer contour and optionally final barrel finishing. When the cams are pressed on axially via their bore 60, the external shape of the cam changes relative to the predefined desired contour, however, not only in the cylindrical region 61, but also in the elevated lobe region 62. To ensure that the cam will have a shape corresponding exactly to the desired contour even when the cams have been press fit onto the shaft body, the cam 3 is received via its circular internal hole 60 on a clamping device, which expands the cam in the same way as during the axial pressing on, during grinding of the external contour 64. For this purpose, the cam may be received on a mechanical or hydraulic clamping element which generates the same type of engagement factor as when the cam is pressed onto the shaft. The external contour may thus be manufactured exactly according to the target contour. When the element is released from the clamping mandrel, it relaxes to a shape other than the target shape, but when cam is press fit on the shaft body it again assumes the desired target shape.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A shaft comprising a shaft body carrying at least one functional element, wherein said functional element is manufactured separately from the shaft body and subsequently the shaft body is extended axially through a bore of the functional element and the bore of the functional element is press fit onto the shaft body to affix the functional element to the shaft body in an axially and rotationally fixed manner, said shaft having at least one journal formed by a roller bearing comprising at least one undivided roller bearing element mounted on the shaft body, further wherein the roller bearing comprises an outer bearing ring with a lubricant hole extending substantially radially therethrough opening into an inner bearing race for bearing rollers, and an annular lubricant groove is provided in the external contour of the journal or in the external contour of the outer bearing ring or in a bearing mounting contour enclosing the outer bearing ring, and at least one of the hole and the annular groove is configured as a throttling element for limiting lubricant flow.

2. A shaft as claimed in claim 1, wherein said functional element is a cam and the shaft is an assembled camshaft for an internal combustion engine.

3. A shaft as claimed in claim 2, wherein the cam has a radially elevated region with an axially extending recess or bore therein.

4. A shaft as claimed in claim 3, wherein the radially elevated region of the cam has an axial bore extending continuously therethrough.

5. A shaft as claimed in claim 1, wherein the at least one undivided roller bearing element is mounted on the shaft body between two attached functional elements.

6. A shaft as claimed in claim 1, wherein the at least one functional element and the at least one undivided roller bearing element are both pushed axially onto the shaft and rotationally fixed to the shaft by press fitting.

7. A shaft as claimed in claim 1, wherein said roller bearing comprises an inner ring disposed on the shaft body, an outer ring disposed around the inner ring, and a plurality of rollers disposed between the inner and outer rings.

8. A shaft as claimed in claim 1, wherein said roller bearing comprises only a plurality of rollers and a single ring.

9. A shaft as claimed in claim 8, wherein a race for the rollers is provided directly on the shaft body, and said single ring is an outer ring disposed surrounding the rollers.

10. A shaft as claimed in claim 9, wherein the race for the rollers is tempered.

11. A shaft as claimed in claim 9, wherein the race for the rollers is ground into the shaft body.

12. A shaft as claimed in claim 9, wherein the race for the rollers is precision turned in the shaft body.

13. A shaft as claimed in claim 1, wherein the roller bearing comprises an inner bearing race surrounded by a ring of rollers which are held together by an undivided roller cage.

14. A shaft as claimed in claim 13, wherein said inner bearing race is formed directly on the shaft body.

15. A shaft as claimed in claim 1, wherein said shaft body is at least partially hollow.

16. A shaft as claimed in claim 15, wherein a hole is provided leading from a hollow interior of the shaft body to the roller bearing.

17. A shaft as claimed in claim 1, wherein the roller bearing comprises an inner bearing ring having an internal annular groove.

18. A shaft as claimed in claim 1, wherein the roller bearing comprises an inner bearing ring seated on the shaft body, and the shaft has an annular groove in the area of the bearing seat.

19. A shaft as claimed in claim 17, wherein the inner bearing ring is provided with a lubricant hole extending substantially radially therethrough and opening into an inner bearing race for the bearing rollers.

20. A shaft as claimed in claim 1, wherein a seal is provided on at least one side of the roller bearing.

21. A shaft as claimed in claim 20, wherein the seal is a gap seal.

22. A shaft as claimed in claim 1, wherein the at least one functional element comprises a balancing weight, and the shaft is an assembled balancer shaft for an internal combustion engine.

23. In an internal combustion engine, the improvement comprising a camshaft having a shaft comprising a shaft body carrying at least one functional element, wherein said functional element is manufactured separately from the shaft body and subsequently the shaft body is extended axially through the bore and a bore of the functional element is press fit onto the shaft body to affix the functional element to the shaft body in an axially and rotationally fixed manner, said shaft having at least one journal formed by a roller bearing comprising at least one undivided roller bearing element mounted on the shaft body, further wherein said functional element is a cam and the shaft is an assembled camshaft for an internal combustion engine, and the roller bearing is an axial and radial bearing having an outer bearing ring, and the shaft is axially secured in the engine by clamping the outer bearing ring in a recess in a cylinder head of the engine.

24. An engine as claimed in claim 23, wherein the shaft is axially fixed by a form fit between a radial contour on the shaft engaged with a mating contour on a cylinder head of the engine.

25. A shaft as claimed in claim 24, wherein the form fit is formed by at least one snap ring.

26. A method for producing a non-circular functional body for press fitting onto a shaft, said method comprising:
   clamping the non-circular functional body on an expandable clamping element by inserting the expandable clamping element through a bore in the non-circular functional body and then expanding the expandable clamping element, whereby the non-circular functional body is deformed into a state corresponding to deformations which arise when the functional body is press fit onto the shaft;
   while the non-circular functional body is clamped and deformed, grinding the non-circular functional body to a target functional shape, and
   thereafter releasing the non-circular functional body from the expandable clamping element.

27. A method as claimed in claim 26, wherein said functional body is a cam and said shaft is a camshaft.

28. A method as claimed in claim 26, wherein said expandable clamping element is a mandrel.

29. A method for producing a camshaft with at least one cam and a shaft, said method comprising:

clamping said cam on an expandable clamping element by inserting said expandable clamping element through a bore in said cam and then expanding said expandable clamping element, whereby said cam is deformed into a state corresponding to deformations which arise when said cam is press fit onto said shaft;

while said cam is clamped and deformed, grinding said cam to a target functional shape, releasing said cam from said clamping element, and press fitting said cam onto said shaft.

30. A method as claimed in claim 29, wherein said expandable clamping element is a mandrel.

* * * * *